US009081873B1

(12) United States Patent
Bawcom et al.

(10) Patent No.: US 9,081,873 B1
(45) Date of Patent: *Jul. 14, 2015

(54) METHOD AND SYSTEM FOR INFORMATION RETRIEVAL IN RESPONSE TO A QUERY

(71) Applicants: Aaron N. Bawcom, Atlanta, GA (US); Christopher M. Madden, Alpharetta, GA (US)

(72) Inventors: Aaron N. Bawcom, Atlanta, GA (US); Christopher M. Madden, Alpharetta, GA (US)

(73) Assignee: STRATACLOUD, INC., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/630,634

(22) Filed: Sep. 28, 2012

Related U.S. Application Data

(63) Continuation-in-part of application No. 12/573,587, filed on Oct. 5, 2009, now Pat. No. 8,805,875.

(60) Provisional application No. 61/540,657, filed on Sep. 29, 2011.

(51) Int. Cl.
G06F 17/30 (2006.01)
(52) U.S. Cl.
CPC .............................. G06F 17/30979 (2013.01)
(58) Field of Classification Search
CPC ............................... G06F 17/30; G06F 17/00
See application file for complete search history.

(56) References Cited

U.S. PATENT DOCUMENTS

| 5,905,982 | A  | * | 5/1999  | Carey et al. ........... 707/694 |
| 6,253,195 | B1 |   | 6/2001  | Hudis et al. |
| 6,421,662 | B1 | * | 7/2002  | Karten ........................ 1/1 |
| 6,742,175 | B1 | * | 5/2004  | Brassard ................. 717/107 |
| 6,760,746 | B1 | * | 7/2004  | Schneider ............... 709/203 |
| 7,035,846 | B2 | * | 4/2006  | Gupta et al. .................. 1/1 |
| 7,284,245 | B2 |   | 10/2007 | Novik et al. |
| 7,299,171 | B2 | * | 11/2007 | Ta et al. ..................... 704/9 |
| 7,539,667 | B2 | * | 5/2009  | Lindsay et al. ............... 1/1 |
| 7,644,064 | B2 | * | 1/2010  | Eppley et al. ...... 707/999.003 |
| 7,774,485 | B2 |   | 8/2010  | Patrick et al. |
| 7,827,523 | B2 |   | 11/2010 | Ahmed et al. |
| 7,917,547 | B2 | * | 3/2011  | Hughes et al. ........... 707/804 |
| 7,941,460 | B2 |   | 5/2011  | Bar-Or et al. |
| 7,984,043 | B1 |   | 7/2011  | Waas |
| 8,046,352 | B2 | * | 10/2011 | Basu et al. .............. 707/713 |
| 8,060,516 | B2 | * | 11/2011 | Weissman ............... 707/742 |
| 8,078,609 | B2 | * | 12/2011 | Black ...................... 707/713 |

(Continued)

OTHER PUBLICATIONS

Cleenewerck, Thomas. "Modularizing Language Constructs: A Reflective Approach." Doktorarbeit, Vrije Universteit Brussel (2007), pp. 1-394.*

(Continued)

Primary Examiner — Farhan Syed
(74) Attorney, Agent, or Firm — DLA Piper LLP US

(57) ABSTRACT

A machine-implemented system and method of information retrieval, comprising: receiving queries including an ordered set of clause definitions, each clause definition including a clause pipeline, wherein a clause pipeline includes an ordered set of clause specifications that comprises an expansion operation and/or a filter operation, where the queries are received from a calling application; parsing the queries into a collection of expression pools; processing data by the expression pools in the collection to generate a current object set; and returning the current object set to the calling application in response to the queries.

26 Claims, 13 Drawing Sheets

(56) References Cited

U.S. PATENT DOCUMENTS

| | | | | |
|---|---|---|---|---|
| 8,204,903 | B2* | 6/2012 | Bowers et al. | 707/773 |
| 8,676,937 | B2* | 3/2014 | Rapaport et al. | 709/219 |
| 8,745,070 | B2* | 6/2014 | Krishnamurthy et al. | 707/751 |
| 8,793,275 | B1* | 7/2014 | Gough et al. | 707/770 |
| 8,805,875 | B1* | 8/2014 | Bawcom et al. | 707/770 |
| 8,812,487 | B2* | 8/2014 | Krishnamurthy et al. | 707/718 |
| 2003/0041142 | A1 | 2/2003 | Zhang et al. | |
| 2004/0059719 | A1* | 3/2004 | Gupta et al. | 707/3 |
| 2004/0260685 | A1 | 12/2004 | Pfleiger et al. | |
| 2004/0267760 | A1* | 12/2004 | Brundage et al. | 707/100 |
| 2005/0187906 | A1* | 8/2005 | Madan et al. | 707/3 |
| 2005/0198065 | A1* | 9/2005 | Eppley et al. | 707/104.1 |
| 2005/0210023 | A1* | 9/2005 | Barrera et al. | 707/5 |
| 2006/0005122 | A1* | 1/2006 | Lemoine | 715/513 |
| 2006/0041421 | A1* | 2/2006 | Ta et al. | 704/5 |
| 2006/0089945 | A1* | 4/2006 | Paval | 707/102 |
| 2006/0294087 | A1* | 12/2006 | Mordvinov | 707/4 |
| 2007/0050343 | A1* | 3/2007 | Siddaramappa et al. | 707/3 |
| 2007/0061305 | A1* | 3/2007 | Azizi | 707/3 |
| 2007/0061427 | A1* | 3/2007 | Vishnia-Shabtai et al. | 709/220 |
| 2007/0071146 | A1* | 3/2007 | Scaglione et al. | 375/346 |
| 2007/0078816 | A1* | 4/2007 | Stern et al. | 707/2 |
| 2007/0299804 | A1 | 12/2007 | Liu et al. | |
| 2008/0059607 | A1* | 3/2008 | Schneider | 709/218 |
| 2008/0120283 | A1 | 5/2008 | Liu | |
| 2008/0162409 | A1 | 7/2008 | Meijer et al. | |
| 2008/0177748 | A1 | 7/2008 | Rondot | |
| 2008/0301175 | A1 | 12/2008 | Applebaum et al. | |
| 2009/0024622 | A1 | 1/2009 | Chkodrov et al. | |
| 2009/0100022 | A1* | 4/2009 | Nayak et al. | 707/3 |
| 2009/0228434 | A1* | 9/2009 | Krishnamurthy et al. | 707/2 |
| 2009/0319499 | A1 | 12/2009 | Meijer et al. | |
| 2011/0275432 | A1* | 11/2011 | Lutnick et al. | 463/25 |
| 2012/0124031 | A1* | 5/2012 | Krishnamurthy et al. | 707/718 |
| 2012/0124096 | A1* | 5/2012 | Krishnamurthy et al. | 707/792 |
| 2012/0290950 | A1* | 11/2012 | Rapaport et al. | 715/753 |
| 2014/0237540 | A1* | 8/2014 | King et al. | 726/1 |
| 2015/0026160 | A1* | 1/2015 | Gough et al. | 707/722 |

OTHER PUBLICATIONS

Lin, Ling. "Study of Supporting Sequences in DBMSs-Data Model, Query Language, and Storage Management." Computer and Information Science 3, No. 4 (1998), pp. 1-15 (17 total pages).*

Bamford, Roger, Vinayak Borkar, Matthias Brantner, Peter M. Fischer, Daniela Florescu, David Graf, Donald Kossmann et al. "Xquery reloaded." Proceedings of the VLDB Endowment 2, No. 2 (2009): 1342-1353.*

U.S. Appl. No. 12/573,587.

U.S. Appl. No. 14/276,118.

Bradley Berg, "The Aurora Project", http://cs.brown.edu/research/aurora/, Dec. 8, 2014 (10 pages), retrieve from web.archive.org, archived Oct. 11, 2008.

http://www.streambase.com/, retreived from web.archive.org, archived Mar. 23, 2009 (46 pages).

http://www.rulecore.com/, retreived from web.archive.org, archived May 26, 2009 (25 pages).

http://www.sqlstream.com/, retreived from web.archive.org, archived Apr. 14, 2009 (96 pages).

http://en.wikipedia.org/wiki/Lexical_analysis, retreived from web.archive.org, archived Sep. 30, 2009 (6 pages).

http://en.wikipedia.org/wiki/Parsing, retreived from web.archive.org, archived Sep. 30, 2009 (7 pages).

http://en.wikipedia.org/wiki/Compiler, retreived from web.archive.org, archived Dec. 19, 2008 (10 pages).

http://en.wikipedia.org/wiki/Process, retreived from web.archive.org, archived Apr. 23, 2009 (2 pages).

http://en.wikipedia.org/wiki/Message_passing, retreived from web.archive.org, archived Mar. 27, 2009 (4 pages).

http://esper.codehaus.org/, retreived from web.archive.org, archived Sep. 16, 2009 (89 pages).

http://research.microsoft.com/en-us/projects/dryad/, retreived from web.archive.org, archived Sep. 26, 2009 (13 pages).

* cited by examiner

Object Schema

Set Expansion

Set Reduction

```
{ position : {
        "num_shares": 300,
        "symbol": IBM,
        "long_term": true
}}
```
FIGURE 7
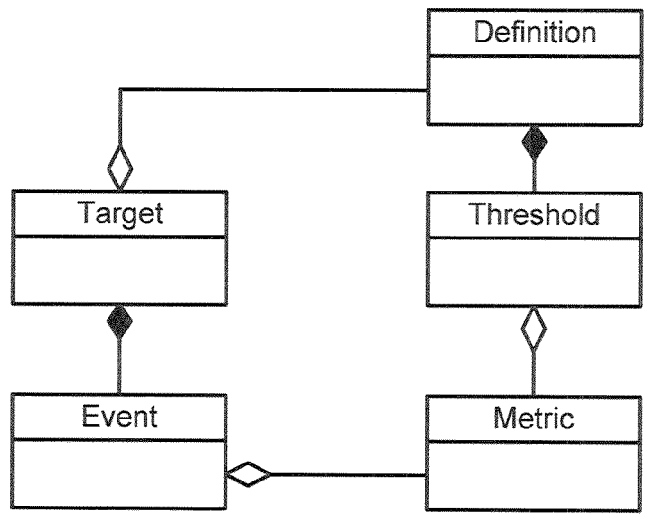
FIGURE 9
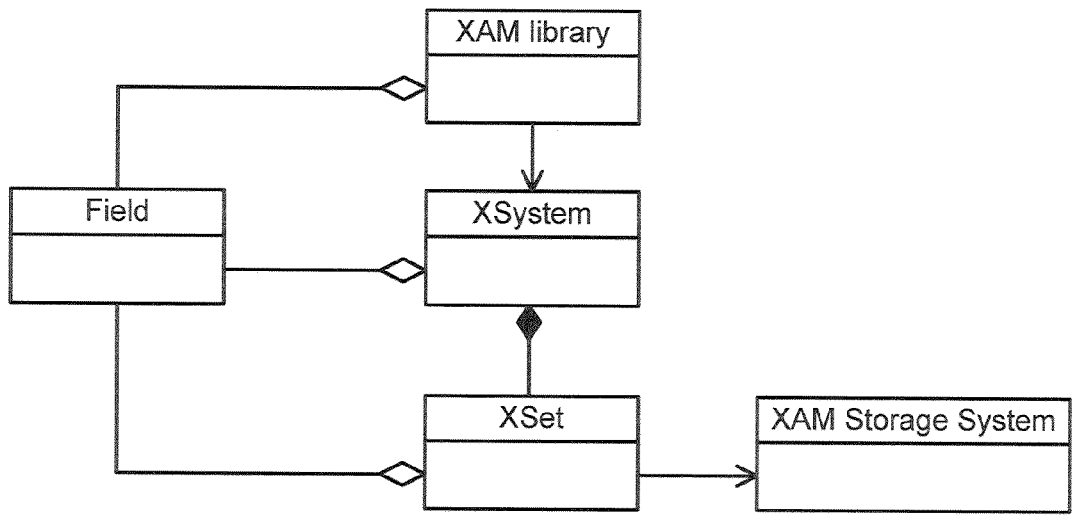
FIGURE 10

FIGURE 11

| |
|---|
| All VM's on Host "X" at MM/DD/YYY |
| Host.name = X project child at 2007/12/01  10:10:45 |

| |
|---|
| The VM that was created on MM/DD/YY and was connected to the ZZZ network |
| vnic.network = ZZZ project vm \| vm.created = 2007/12/01 |
| All VM's that VM "X" is in the same broadcast domain with |
| vm.name = X project bcast \| project vm |

| |
|---|
| All security events for VM "X" at time MM/DD/YYYY |
| vm.name = X project security between 2007/12/01  00:00:00 thru 2007/12/01 23:59:59 |

| |
|---|
| All Services seen to VM "Y" at time MM/DD/YYYY |
| vm.name = Y project services between 2007/12/01  00:00:00 thru 2007/12/01 23:59:59 |

| |
|---|
| Throughput of VM "X" at MM/DD/YYYY |
| vn.name = X project vnic_perf at 2007/12/01  10:10:45 |

| |
|---|
| Any objects that include the strings "SQL" and "Server" in any of their properties |
| SQL Server |

| |
|---|
| Any virtual machines that have ever run SQL Server<br>SQL Server project vm |

| |
|---|
| All virtual machines that were running SQL Server software greater than version 9.2 two months ago<br>SQL Server and VersionMajor >= 9 and VersionMinor >= 2 project vm at 8 weeks ago |

| |
|---|
| All virtual machines that were running SQL Server, had a VM disk alarm, and a host disk alarm 1 hour ago |
| SQL Server project vm in alarm.name = "Host Disk Usage" project vm in alarm.name = "VM Disk Usage" project vm at 1 hour ago |

FIGURE 12

```
LOGICAL_CONDITIONAL ::= 'AND' | 'OR'
EXPANSION ::= 'PROJECT' | 'EXPAND'
SET_OPERATION ::= 'INCLUDE' | 'IN' | 'WITHOUT'
BOOLEAN ::= 'true' | 'false'
IS ::= 'IS'
AT ::= 'AT'
AGO ::= 'AGO'
NOT ::= 'NOT' | '!'
BETWEEN ::= 'BETWEEN'
THRU ::= 'THRU'
EMPTY ::= 'EMPTY'
STARTSWITH ::= 'STARTSWITH'
ENDSWITH ::= 'ENDSWITH'
CONTAINS ::= 'CONTAINS'
REGEX ::= 'REGEX'
GREATER ::= 'GREATER'
LESS ::= 'LESS'
THAN ::= 'THAN'
EQUALS ::= 'EQUALS'

LEFT_PAREN ::= '('
RIGHT_PAREN ::= ')'
PIPELINE ::= '|'
OBJECT_DELIMITER ::= '.'
COLON ::= ':'
DASH ::= '-'
SIMPLE_PROPERTY_OP ::= '=' | '!=' | '>' | '>=' | '<' | '<=' |
                CONTAINS           |
                STARTSWITH         |
                ENDSWITH           |
                REGEX              |
                NOT? EQUAL         |
                GREATER THAN EQUAL? |
                LESS THAN EQUAL?

IS_PROPERTY_OP ::= IS NOT?

UPPER ::= 'A' .. 'Z'
LOWER ::= 'a' .. 'z'
LETTER ::= UPPER | LOWER
DIGIT ::= '0' .. '9'
SPACE ::= ' ' | '\t'

SINGLE_QUOTE ::= '\''
DOUBLE_QUOTE ::= '"'

NUMBER ::= DASH? DIGIT+

WORD ::= LETTER (LETTER | DIGIT | '_')*
SINGLE_QUOTE_STRING ::= SINGLE_QUOTE (~SINGLE_QUOTE)* SINGLE_QUOTE
DOUBLE_QUOTE_STRING ::= DOUBLE_QUOTE (~DOUBLE_QUOTE)* DOUBLE_QUOTE
STRING_LITERAL = SINGLE_QUOTE_STRING | DOUBLE_QUOTE_STRING
TIME_INTERVAL ::= WORD // allow for minute, minutes, min, etc
```

FIGURE 13

```
QUERY ::= CLAUSE_DEFINITION (SET_OPERATION CLAUSE_DEFINITION)*

CLAUSE_DEFINITION ::= CLAUSE_PIPELINE CLAUSE_TIME_SPEC?

CLAUSE_PIPELINE ::= CLAUSE_SPEC (PIPELINE CLAUSE_SPEC)*
CLAUSE_SPEC ::= EXPANSION_SPEC | FILTER_SPEC EXPANSION_SPEC?
EXPANSION_SPEC ::= EXPANSION WORD (COLON NUMBER)?
FILTER_SPEC ::= NOT? PROPERTY_FILTER_SPEC (LOGICAL_CONDITIONAL?
PROPERTY_FILTER_SPEC)*

PROPERTY_FILTER_SPEC ::= PROPERTY_SPEC | LEFT_PAREN FILTER_SPEC RIGHT_PAREN
PROPERTY_SPEC ::=
      // [object.]property[.property]... op value
      OBJECT_SPECIFIER? PROPERTY_SPECIFIER SIMPLE_PROPERTY_OP
SIMPLE_PROPERTY_VALUE |
      OBJECT_SPECIFIER? PROPERTY_SPECIFIER IS_PROPERTY_OP
ASSERTION_PROPRETY_VALUE |
      OBJECT_SPECIFIER? PROPERTY_SPECIFIER SIMPLE_PROPERTY_OP
DATE_PROPERTY_VALUE |

// really short cut, short cuts to object.property operator value
      SIMPLE_PROPERTY_VALUE

OBJECT_SPECIFIER ::= WORD
PROPERTY_SPECIFIER ::= (OBJECT_DELIMITER WORD)+ | WORD

ASSERTION_PROPERTY_VALUE ::= EMPTY

SIMPLE_PROPERTY_VALUE ::= WORD | STRING_LITERAL | BOOLEAN | NUMBER

DATE_PROPERTY_VALUE ::= ABSOLUTE_TIME_SPEC | RELATIVE_TIME_SPEC

CLAUSE_TIME_SPEC ::= AT ABSOLUTE_TIME_SPEC |
      AT RELATIVE_TIME_SPEC AGO |
      BETWEEN ABSOLUTE_TIME_SPEC THRU ABSOLUTE_TIME_SPEC |
      BETWEEN RELATIVE_TIME_SPEC AGO? THRU RELATIVE_TIME_SPEC AGO?

// YYYY-MM-DD HH:MM:SS
ABSOLUTE_TIME_SPEC ::= NUMBER DASH NUMBER DASH NUMBER NUMBER 5 COLON NUMBER COLON
NUMBER

// X intervals
RELATIVE_TIME_SPEC ::= NUMBER TIME_INTERVAL
```

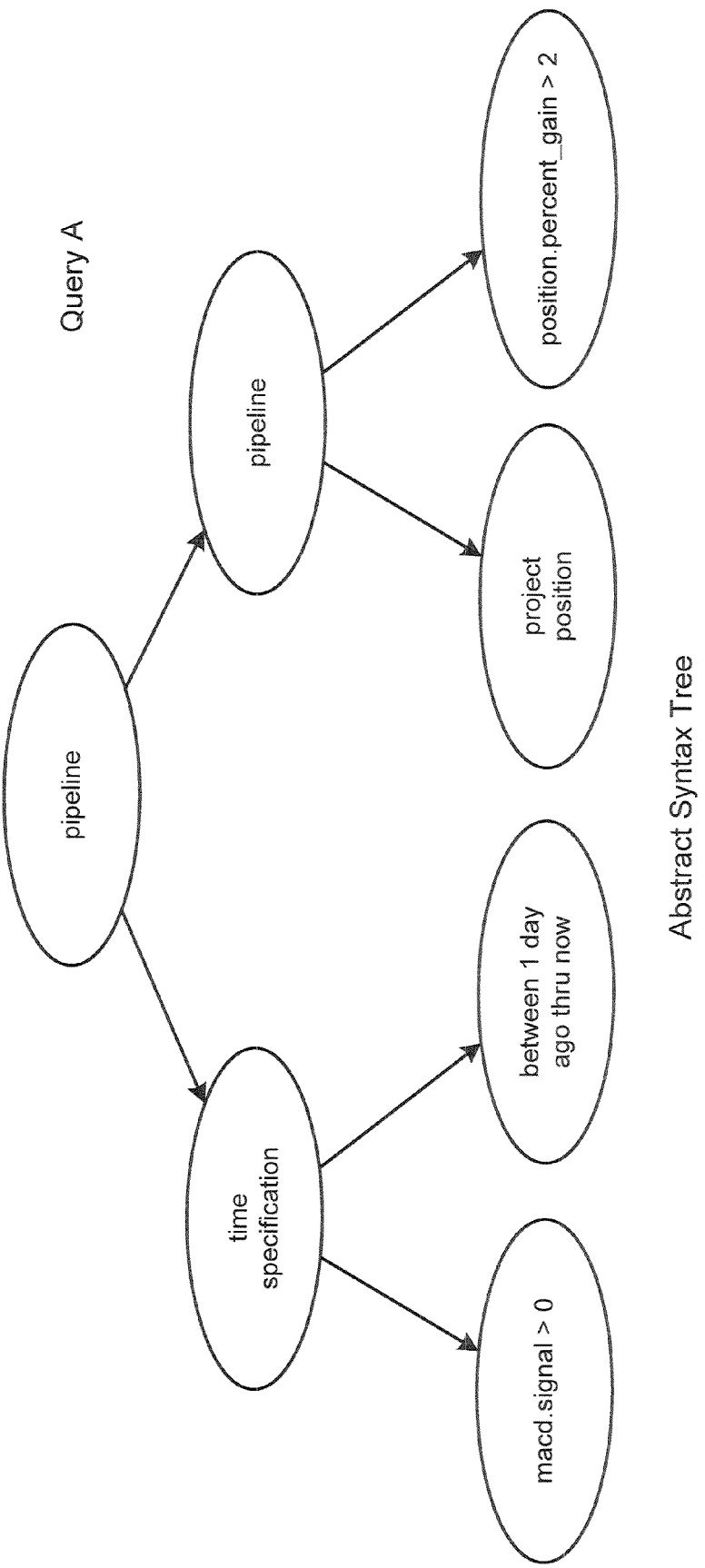

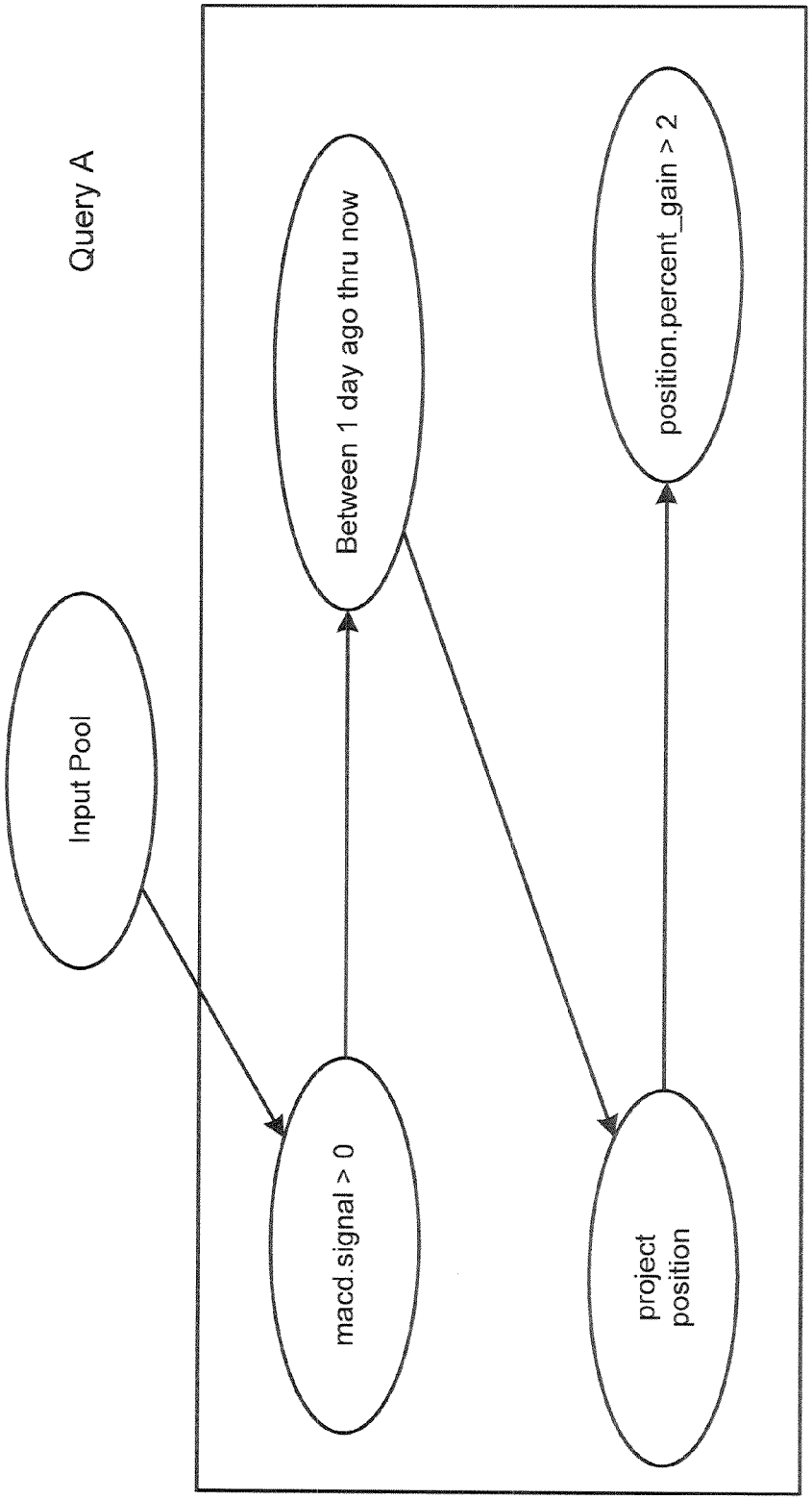

METHOD AND SYSTEM FOR INFORMATION RETRIEVAL IN RESPONSE TO A QUERY

CROSS-REFERENCE TO RELATED APPLICATIONS

This application claims the benefit of U.S. Provisional Application No. 61/540,657, filed Sep. 29, 2011, and is a Continuation-in-Part of U.S. patent application Ser. No. 12/573,587, filed Oct. 5, 2009. All of the forgoing applications are incorporated by reference in their entireties for all purposes.

BRIEF DESCRIPTION OF THE DRAWINGS

FIG. 7 is an example of an HTTP-based query entity making a request to the query system and the results returned from that request, according to an embodiment.

FIG. 9 is a representative UML-based model of an IT infrastructure that is generated by a model builder, according to an embodiment.

FIG. 10 is a representative UML-based model of a streaming performance data model that is generated by a model builder, according to an embodiment.

FIG. 11 is a set of representative examples of requests for desired information and, for each request, the query string that is used to generate the desired results using the techniques described herein, according to an embodiment.

FIG. 12 a set of lexigraphical constructs, according to an embodiment.

FIG. 13 is the rules and principles that govern the structure of a query, according to an embodiment.

FIGS. 14 and 15 provide an example of a query and the corresponding abstract syntax tree, and how data will flow through the expression pools of the query, according to an embodiment.

DETAILED DESCRIPTION OF EMBODIMENTS

The following definitions apply to components of the system:

A "query" is a string of characters representing data;

An "abstract syntax tree" is a graph of data nodes that represent a parsed structure of a query;

A "query processor" refers to iterations of the abstract syntax tree to produce query results;

A "compiler" is a set of software components that translate a query into an abstract syntax tree;

A "model builder" is a software component that conforms to a defined interface to the query processor for the purpose of providing data from a specific type of data source;

A "query system" is a collection of components that perform data retrieval.

An "input pool" may be a pool of processes that receive data from a message bus, perform initial classification of data, and based on the classification, send data to the initial query pool.

An "initial expression pool" may be a pool of processes representing the first expression of a query dedicated to processing data sent to that query. IF the processes in the initial expression pool classify certain types of data to be forwarded through the pipeline, then that data may be sent to the next pool of processes in the pipeline.

An "expression pool" may be a pool of processes that process data received from either a previous expression pool in the processing pipeline or from the input pool. When an expression pool starts and stops it dynamically subscribes and unsubscribe from a previous expression pool.

"Expression output" may be a pool of processes that receive data from a previous expression pool or the input pool and publish that data to a message bus and/or one or more initial expression pools for other queries.

A "lifecycle" may be a pool of processes that manage the lifecycle of queries. The lifecycle component may translate a textual representation of a query into individual expressions and may then create the expression pools of processes for each expression in the query.

A "query" may be a pipeline of expression pools starting with the initial expression pool and ending with the expression output.

Complex Event Processing (CEP) systems use a language similar to SQL to perform pattern matching on data using criteria at soft real time speeds. Data streams, events in those data streams, fields within those events, and temporal specification in the language are utilized. A CEP system based on a virtual graph based key-value query language is discussed below. This language may offer the ability to express a pipeline of processing steps for data flowing through a query.

Figure 1:
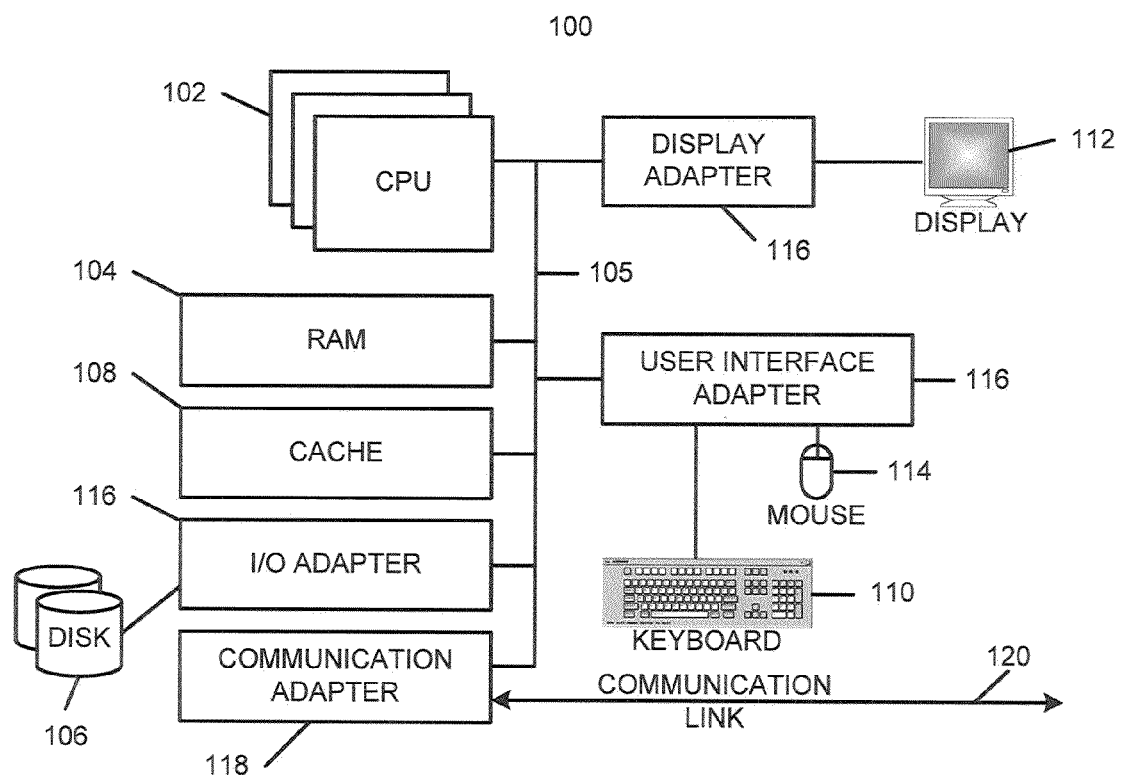
FIG. 1 is an exemplary block diagram of a data processing environment, according to one embodiment.

FIG. 1 is a simplified block diagram of a representative information retrieval system in which the subject matter described herein may be implemented and comprises a data processing system. As seen in FIG. 1, a data processing system 100 suitable for storing and/or executing program code will include at least one processor 102 coupled directly or indirectly to memory elements through a system bus 105. The memory elements can include local memory 104 employed during actual execution of the program code, bulk storage 106, and cache memories 108 that provide temporary storage of at least some program code to reduce the number of times code must be retrieved from bulk storage during execution. Input/output or I/O devices (including but not limited to keyboards 110, displays 112, pointing devices 114, etc.) can be coupled to the system either directly or through intervening I/O controllers 116. Network adapters 118 may also be coupled to the system to enable the data processing system to become coupled to other data processing systems or devices through intervening private or public networks 120.

In some embodiments, the techniques described herein may task the limitations of a single computational server's resources, and thus it is contemplated that one or more process steps or functions may be distributed onto a set or hierarchy of multiple computational servers. Of course, any other hardware, software, systems, devices and the like may be used. More generally, the subject matter described herein may be implemented with any collection of one or more autonomous computers (together with their associated software, systems, protocols and techniques) linked by a network or networks.

A representative information retrieval system in which the disclosed subject matter may be implemented comprises a set of computer resources (typically, software processes, programs, utilities and associated interfaces, data and protocols) to provide a monitoring and reporting tool for IT system administrators and that includes a search capability. Preferably, the tool has the capability of consolidating logs, metrics and other data from various applications, servers and network devices into a searchable repository and can be used to generate graphs, reports, and alerts, and to take other actions. The information retrieval system helps administrators to identify anomalies and to diagnosis problems in the infrastructure. The tool may have the ability to correlate log files across systems and software components, and such data can help users determine root causes when problems arise within the infrastructure. The described subject matter may be implemented within the information retrieval system, or as an adjunct to that system. In one particular implementation, the IT infrastructure is a virtualized infrastructure, such as the VIRTUALIZATION MANAGEMENT CENTER™ (VMC) solution available from Reflex Systems, LLC, of Atlanta, Ga. VMC enables next generation data centers to enforce IT policies, ensure compliance with government mandates and protect virtual servers, desktops, and networks across multiple platforms. In particular, VMC provides a single authoritative visual interface, central management and security for heterogeneous virtual environments. By combining a centralized event database, virtual infrastructure integration and analysis engines with a robust visual interface, VMC enables the user to administer, audit, secure and monitor complex, dynamic, virtual infrastructures. This results in better network and event visibility for a faster and more efficient management and security response.

Figure 2:
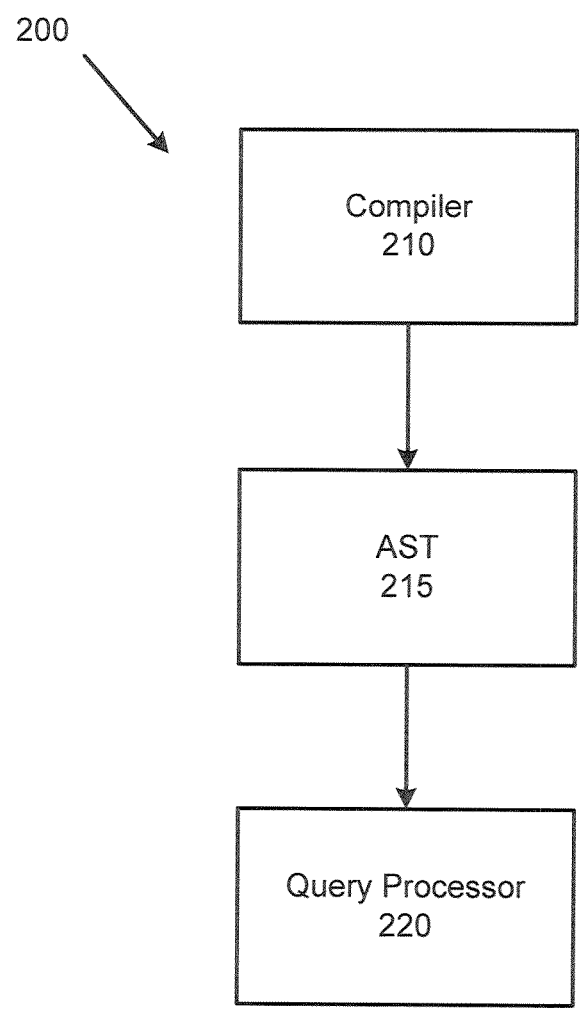
FIG. 2 is a diagram illustrating a streaming information retrieval method 200, according to an embodiment.

FIG. 2 is a data flow diagram illustrating a streaming information retrieval system 200, according to an embodiment. The information retrieval system 200 may comprise a compiler 210, an abstract syntax tree 215, and a query processor 220. The output of the information retrieval system 200 may be an object set.

Figure 3:
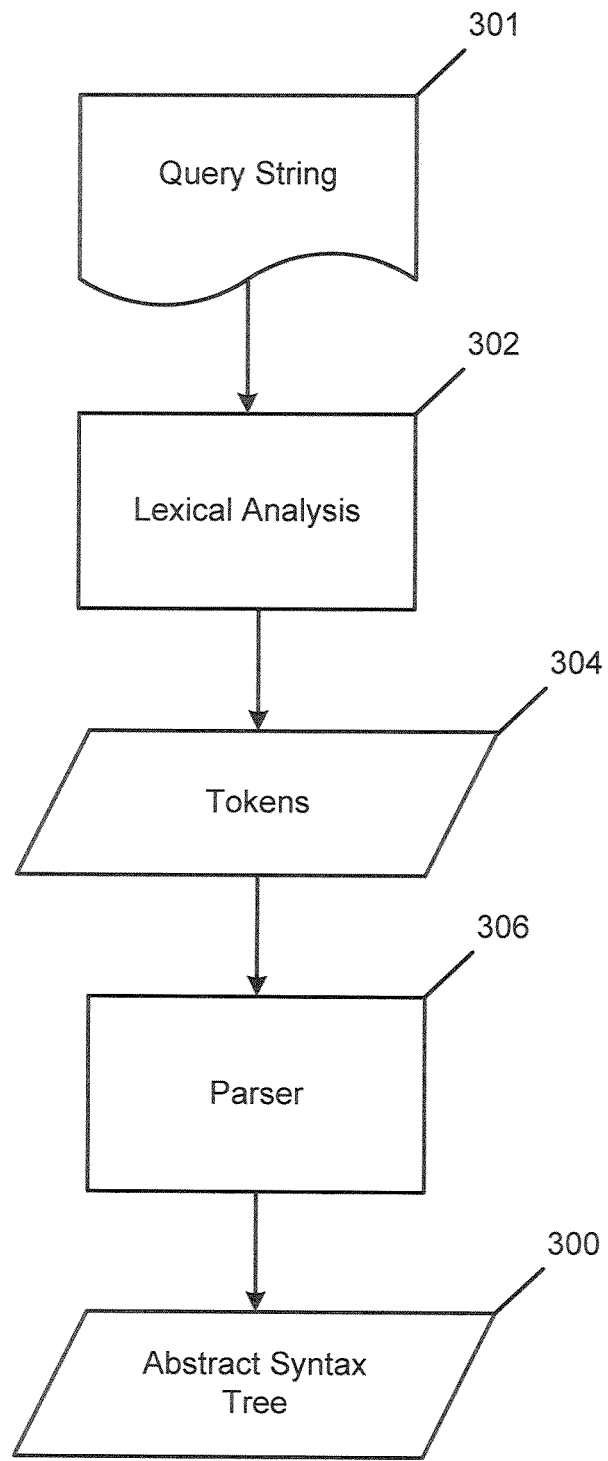
FIG. 3 illustrates details related to the compiler, according to an embodiment.

FIG. 3 is a flowchart illustrating a method carried out by the compiler 210, according to an embodiment. The compiler 210 may perform lexical analysis 302 of a query string 301 based off a set of lexical constructs (described below). The lexical analysis may produce a set of tokens 304, which may then be applied through a parser 306 to generate an abstract syntax tree 300. The compiler may be implemented in any known manner. If desired, the lexical analysis and the parsing may be carried out with just a parser.

Figure 4:
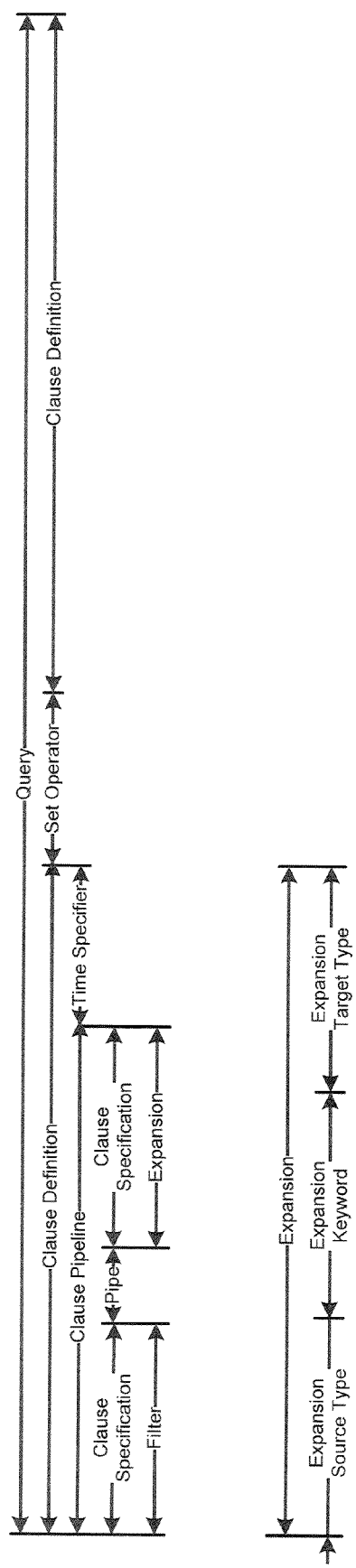
FIG. 4 illustrates a graphical depiction of an abstract syntax tree generated by a compiler, according to an embodiment.

FIG. 4 is a graphical depiction of the abstract syntax tree 300 generated by the compiler, according to an embodiment. As can be seen, a search query is composed of an ordered set of clause definitions, and each clause can have set membership operations (the "set operator") applied to it. Each individual clause includes a clause pipeline, and a time constraint (or "specifier"). A clause pipeline includes an ordered set of clause specifications separated by a pipeline operator (or "pipe"). Preferably, a first clause specification in a pipeline operates on an initial universe of all objects, and each subsequent clause specification operates on a set of objects produced from the previous clause specification. Preferably, a clause specification is either a filtering operation or an expansion operation. Filtering operations in the query use standard grouping Boolean logic for object property comparisons. Expansion operations in the query remove the complexity of object navigation by using an object schema provided by model builders to traverse an object graph for desired objects. The expansion operation typically includes an expansion source type, an expansion keyword, and an expansion target type.

Figure 5:
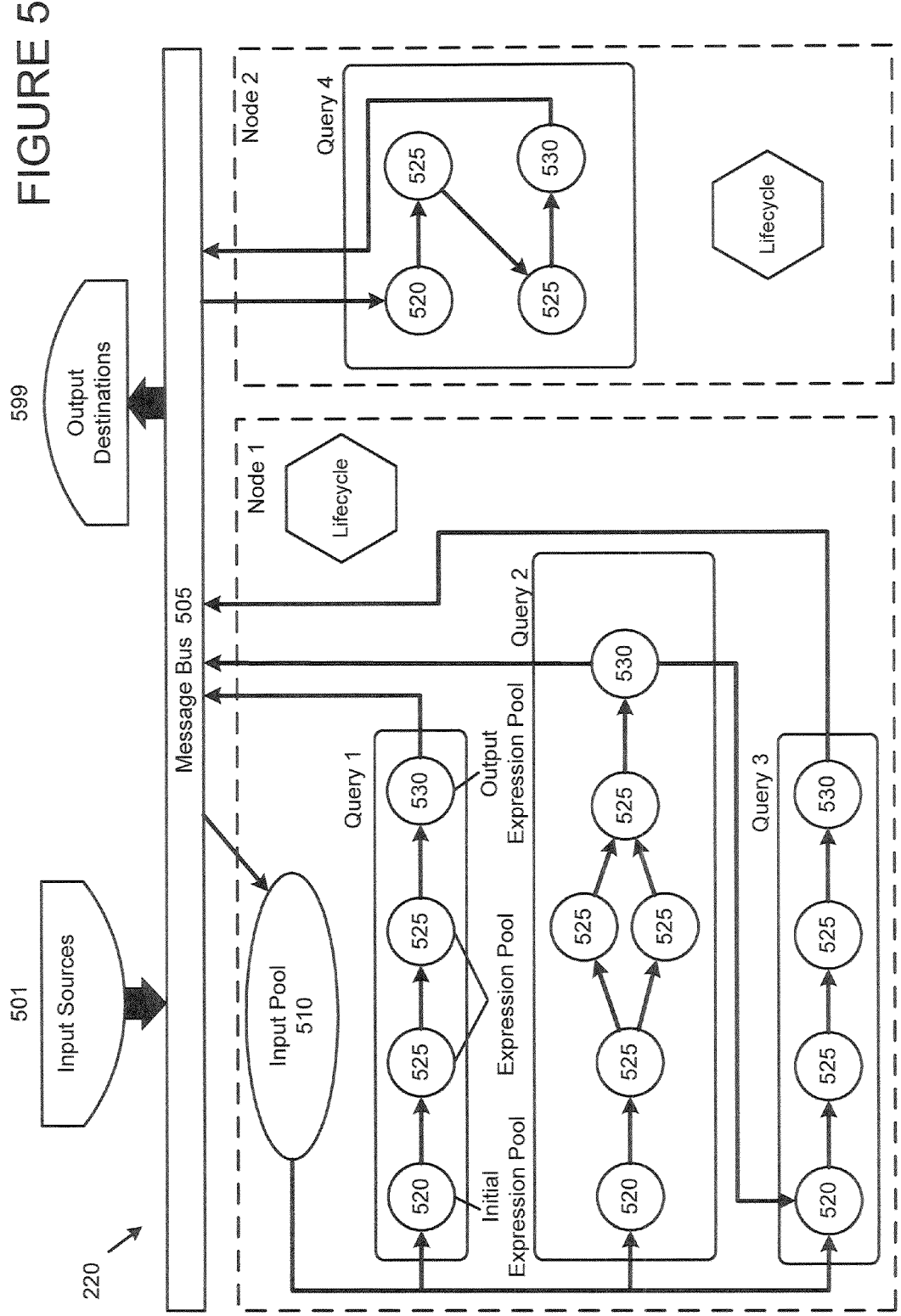
FIG. 5 illustrates details related to the query processor, according to an embodiment.

FIG. 5 illustrates how query streaming processing operates in query processor 220, according to an embodiment. A query may be defined as a pipeline of expression pools starting with an initial expression pool 520 and ending with an output expression pool 530. Each expression pool may be a collection of processes, and each process may be a sequence of logic with its own memory space. The processing may be done incrementally, and queries may be added and/or queries may be removed during run-time. A software-based virtual processor may be utilized to process the instructions from the expression pools.

A lifecycle may be a pool of processes that manage the lifecycle of queries. The lifecycle component may translate a textual representation of a query into individual expressions and may then create the expression pools 520, 525, 530 of processes for each expression in the query.

In one embodiment, multiple queries may be parsed into a collection of expression pools. Then, data may be processed, on an iterative basis, by the expression pools in the collection to generate a current object set. Referring to FIG. 5, a message bus 505 may receive data from input sources 501. The message bus 505 may receive data from data publishers and send data to data publishers. The message bus 505 may also send data to an input pool 510. The input pool 510 may be a pool of processes that receive data from the message bus 505, perform initial classification of data, and based on that classification, send certain data to the initial expression pool 520. Thus, the input pool 510 may receive criteria for different queries. For example, the input pool 510 may receive information that when objects with certain properties are received by the input pool, those objects should be sent to certain queries (e.g., queries 1, 9 and 45). Once the input pool 510 sends data to the queries (e.g, 1, 2 and 3 in FIG. 2), the data is received by a query's initial expression pool 520. The initial expression pool 520 may be a pool of processes representing the first expression of a query dedicated to processing data sent to that query. If the processes in the initial expression pool 520 classify certain types of data to be forwarded through the pipeline, then that data may be sent to the next pool of processes in the pipeline. Thus, the initial expression pool 520 may process the data and then send the data to the query's additional expression pools 525 until the processed data reaches the query's output expression pool 530. The additional expression pools 525 may be a pool or processes the process data received from either a previous expression pool in the processing pipeline, or form the initial expression pool 520. When an expression pool starts and stops, it may dynamically subscribe and unsubscribe from a previous expression pool. The expression output pool 530 may be a pool of processes that receive data from a previous expression pool 520 or the initial expression pool 520 and publish that data to the message bus 505 and/or an initial expression pool for other queries in the same node and/or in another node. The initial expression pools 520 and the expression pools 525 may process the data in, for example, but not limited to, the following ways: filtering, non-filtering, expanding, traversing relationships to other objects; or manufacturing new objects; or any combination thereof.

As described above, once the data is processed by the expression pools 525, the data may be sent from the query's output expression pool 530 to the message bus 505, and then to an output destination 599.

Using the methodology described in FIG. 5, multiple queries (e.g., hundreds of thousands, millions) may be processed at the same node. In addition, multiple queries may be processed at the same time across multiple nodes. The nodes may be interconnected nodes that may process the output of other nodes. In this way, the data may be processed very quickly.

FIGS. 14 and 15 provide an example of a query and the corresponding abstract syntax tree, and how data will flow through the expression pools of the query. The query is macd.signal>0 between 1 day ago thru now|project position|position.percent_gain>2. In FIG. 14, the query is broken down into various clauses using the expression of the query. Thus, in FIG. 14, the abstract syntax tree is comprised of constructs from the language grouped into a tree structure with four expressions (e.g., macd.signal>0, between 1 day ago thru now, project position, position.percent_gain>2). FIG. 15 illustrates how data will logically flow through the four expression pools. Note that the expression pools are derived from the expressions.

Figure 6:
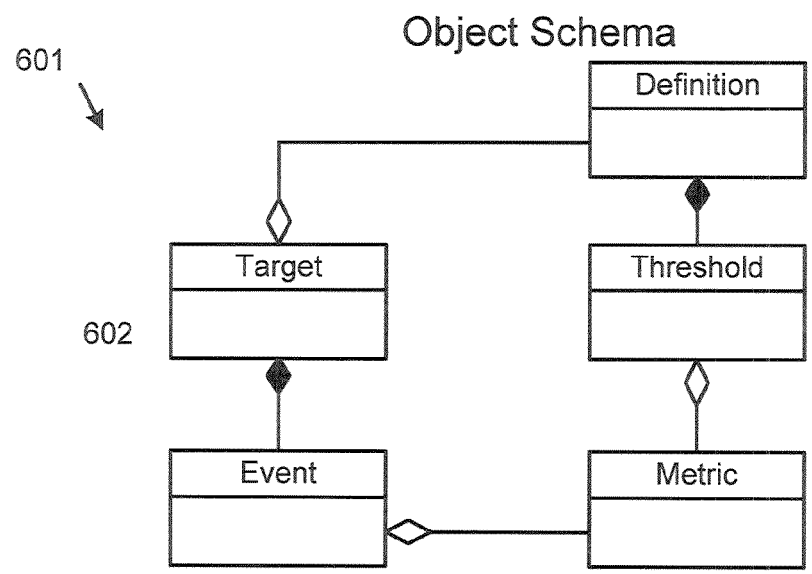
FIG. 6 illustrates components of a model builder object, according to an embodiment.
Figure 6:
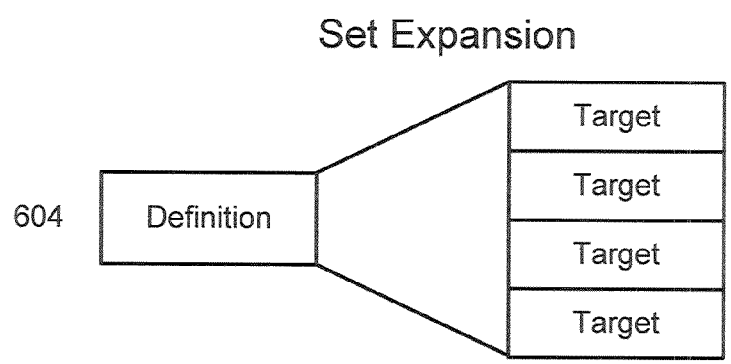
Figure 6:
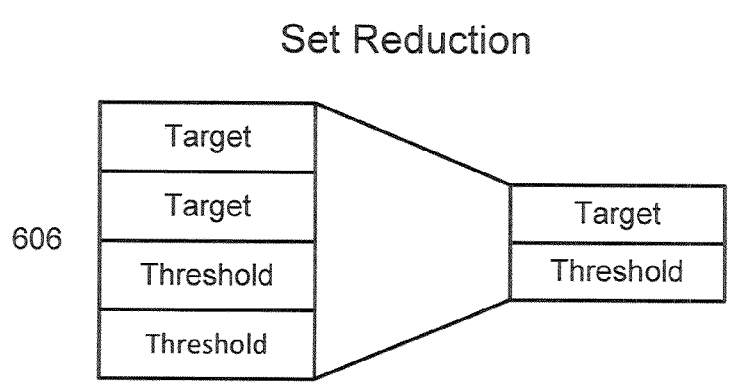

Referring now to FIG. 6, a model builder object 601 is characterized by one or more of the following: an object schema 602, a set expansion 604 and a set reduction 606. The properties of an object are provided by the object schema 602, and a representative schema is illustrated using a UML-based model. A set expansion 604 produces a set of new objects based off of a source object. A set reduction filters a superset of objects down to a smaller set based off of given filter criteria. The objects in an object set pipeline are provided by an underlying system of model builders. Thus, a given model builder provides the query processor with an object schema, object set expansions, and object set reductions. The expansion specifications are defined in more detail below in the "Parse Constructs" section.

The model builders provide this data to the search language constructs in a single unified data model. In an IT infrastructure environment, the object types constitute generalized IT objects. Examples of object types include, but are not limited to: virtual machines, physical hosts, groups of systems, clusters, network interfaces, switches, software, processes, protocols, memory, CPUs, system events, storage, files, and networks. Of course, these examples are merely illustrative, and the object type of course will vary depending on the implementation environment.

A model builder thus provides primitive data objects to the query processor. A model builder obtains data from a data source and generates a data model. As noted, a data source may be one of: a historical database, an on-demand data source accessed via an API, a streaming data source, or the like. The models are used during the processing by the query processor of the abstract syntax tree, which is generated as an output from the compiler (which receives as input tokens produced from lexical analysis of the query string).

The boundary between the query processor and a model builder conforms to a well-defined interface. As noted above, this interface ensures that a model builder provides the query processor with a heterogeneous object schema, object set expansions based on expansion specifications, and object set reductions based off of filters. As noted above, an object set expansion produces a set of new objects based off a source object. For example, the query vm.name=foo project_vnic may expand a set of one vm object to a set of more than one vnic objects. In this case, the query processor calls on the model builder provided object set explanation function and preferably passes in an instance of a vm object; the model builder expands that object to a set of vnic objects, which set is then returned to the query processor. In contrast, an example object set reduction simply filters a superset of objects down to a smaller set based on a given filter criteria. Continuing with this example, if the current object set comprises of vm objects and each has a mem (memory) property, a clause specification of vm.mem>2048 would filter out any vm objects whose mem properties were less than or equal to 2048; thus, an object set reduction would produce a reduced set of objects from the original set. In this case, the query processor preferably passes in the filter vm.mem<2048 to the model builder provided set reduction function. This method then returns a subset of the vm objects that were passed into the method call.

As these examples illustrate, the query processor maps the different heterogeneous object schemas together from multiple model builders to provide a single unified query interface, even from potentially heterogeneous data storage systems.

As another concrete example, consider the query vm.name=foo project cpu_perf at 1 week ago. This query uses two different model builders. The first model builder uses a historical SQL-based database system, and the second model builder uses a SOAP based API. Using the techniques described herein, the query processor has integrated the two different heterogeneous object types into a single unified object model. In particular, the query processor deduces that the vm object type is provided by the historical database system and delegates the filtering of the vm object named foo to it. The query processor then deduces that the cpu_perf object type is provided by the second model builder. Once the vm object is returned by the first model builder, it is then passed in conjunction with a time specification as filter parameters to the second model builder, thereby producing a resulting cpu_perf object.

When queries are executed, the resulting object set may be returned to the message bus 505 (as illustrated in FIG. 5). Several different types of object interchange formats can be used to return the resulting data objects including, without limitation, JSON, YAML, XML, .Net, Java, or Google Protocol Buffers. The output of the query can be used by any existing procedural language to conduct any further operations on the data, such as auto-response capabilities. FIG. 7 is an example of an HTTP-based query entity making a request and the results returned from that request.

Figure 8:
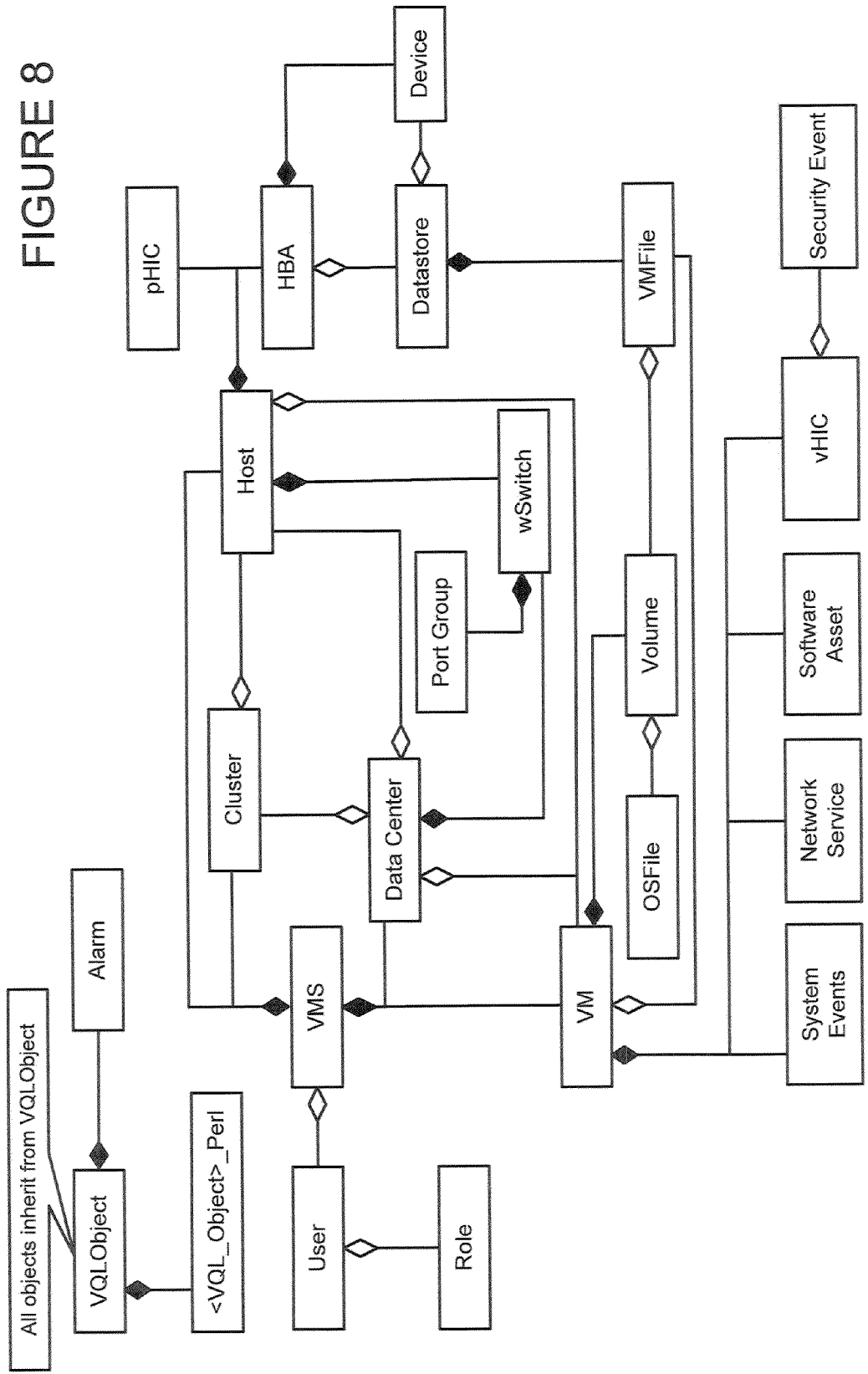
FIG. 8 is a UML-based model of a unified type model generated from different model builders, according to an embodiment.

FIG. 8 is a UML-based model of a unified type model generated from different model builders. FIG. 9 is a representative UML-based model of an IT infrastructure that is generated by a model builder. FIG. 10 is a representative UML-based model of a streaming performance data model that is generated by a model builder.

FIG. 11 is a set of representative examples of requests for desired information and, for each request, the query string that is used to generate the desired results using the techniques described herein.

The various components (e.g., compiler, query processor, model builder) typically are implemented as one or more computer programs, where a computer program is a set of computer program instructions stored in a computer memory or data store and adapted to be executed by one or more processors to perform a process or method having a set of functions or operation steps. As noted above, a model builder extracts data from any type of data source, such as a relational database system (RDBMS) or an application programming interface (API). By providing the model builder abstraction layer, the language itself can query data in several different heterogeneous data storage systems, and it can then provide any type of dictionary of objects and properties. Using this abstraction, the model builder can introduce new objects, relationships, and properties without modifying the language structure itself. In addition, the model builder can query a single relational database system and the contents of that database can include data from multiple heterogeneous systems.

Model builders can provide data from any data source. Preferably, querying a model builder not only queries factual data but can also query correlated information, as well as logically-derived information at the time of query execution from a data source. For example, a model builder can store the fact that virtual network interface A is on VLAN 12 and virtual network interface B is on VLAN 12. A model builder can correlate those two facts into a new primitive property that has a relationship with both virtual machines. The model builder can present this new property to the language without requiring a change to the language.

Moreover, because model builders can derive new properties and objects based on factual data, model builders themselves can create new language properties and objects based on persisted state within a source data structure. For example, a model builder can provide a named property on a virtual machine object if there is data within the source data store that provides evidence that the virtual machine was connected to an insecure network in the past.

As noted above, object relationships either can be encoded as facts in the underlying model, or they can be derived from facts within the model builder itself. Expansion operations in the query remove the complexity of object navigation by using the object schema provided by model builders to traverse an abstract syntax tree for desired objects. Filtering operations in the query use standard grouping Boolean logic for object property comparisons. Preferably, the language need include any type information for objects but instead provides operators that the model builders map to native object type operations to produce results.

When a user issues an on-demand query to the query system, the model builders preferably distribute the processing of the query across multiple data processing engines for the purpose of data correlation and improving query performance. Moreover, because model builders can provide data from any data source, the system can also provide query specifications to a model builder that processes streaming data (as opposed to mere static data or data that is retrieved on-demand). Thus, the language can specify a single query across multiple model builders to simultaneously provide query results from a static model builder, a dynamic model builder, and a streaming model builder. In this way, and as has been described, the system correlates data from multiple data sources.

Because model builders provide most of the breadth of the language, the set of tokens that constitute the language itself is fairly small. To provide natural language query simplicity, the language considers unrecognized tokens as string query specifications for the string versions of all object properties within the universe of the current clause specification the token was found in.

A query processor that implements the language comprises a parser, a lexical analyzer, an abstract syntax tree, and one or more model builders as well as model builders to different types of data storage systems providing high performance pipeline selection logic of disparate objects and properties.

As illustrated in FIG. 2, the execution of the query processor may or may not occur within the process space of a model builder. In appropriate circumstances, it may be desirable to implement remote execution of the query processor to improve query performance over local-process execution. In addition, the language formatting is not line terminated and preferably uses keywords, spacing, and identifiers suitable for UTF-8 encoding in URLs.

Grammar

A context-free grammar for the language is described below. As noted above, the compiler performs lexical analysis of a query string based off a set of lexical constructs. This lexical analysis produces a set of tokens that are then parsed to produce the abstract syntax tree. These constructs are set forth in FIG. 12.

Parse Constructs

The following is a set of parsing constructs (described according to BNF, an industry standard grammar) that are implemented by the parser. Preferably, a search query is composed of an ordered set of clause definitions, and each clause can have set membership operations applied to it. Each clause includes a clause pipeline, and a time constraint. A clause pipeline includes an ordered set of clause specifications separated by a pipeline operator. A clause specification can be either an expansion operation or a filtering operation. Preferably, a first clause specification in a pipeline operates on an initial universe of all objects, and each subsequent clause specification operates on a set of objects produced from the previous clause specification.

An expansion specification uses the object schema provided by the model builder to navigate to specific information the user desires without requiring the user to understand the relationships between all object relationships. As noted above, this technique minimizes query specification size and reduces complexity. There are two types of expansion mechanisms defined: "project" and "expand." Clause specifications are pipelined together, meaning that the objects from a previous clause specification are used as input to a subsequent clause specification. If the previous objects are used to produce the subsequent set but are not included, the keyword "project" is used. If the user wishes to include the previous objects into the new set of objects, then the user specifies the "expand" keyword.

A capability of the language is the inclusion of temporal specification within clause definitions. There are two primary methods for time specification. The first uses the keyword "at," and the second uses the keywords "between" and "thru." Certain types of data can exist across a span of time. An example of this type of data is the running state of a virtual machine, e.g., the virtual machine ran from time A to time B. In these instances, the keyword "at" is used to denote a specific place within that span of time. Other types of data exist only at a particular instance of time as opposed to a time span. An example of that type of data is a particular event, such as an alarm which occurred at an exact time. Thus, a time span is used to include that type of data using the keywords between and thru.

In one embodiment, the disclosed language differs from prior art techniques and existing languages by simultaneously allowing both natural language search and a relationship-driven structured search to be used within a single query specification on a unified data model. In addition, the language also adds two other major differences from existing languages. The language provides for the codification of time in query terms, thereby allowing users to limit query results based off of object property relationships, for example, using instances or ranges of time. The described subject matter also can take advantage of set membership capabilities, including query result unions, intersections, and subtractions. Note that FIG. 13 illustrates the rules and principles that govern the structure of a query, according to an embodiment.

In one embodiment, the present invention provides for a data retrieval system from dissimilar computer software environments to a storage system of computer data. In order to interface the environments, a domain specific language is provided to map abstract data structures in different specific data types of varying composition into a format that is known and can be utilized by an application program. The language provides natural language expressions and default contextual type conversions to handle a full range of user based queries for IT infrastructure. The query system is composed of a compiler as well as model builders to different types of data storage systems providing high performance pipeline selection logic of disparate objects and properties.

The disclosed techniques provide the ability to produce query results based on the codification of IT infrastructure with complex relationships requiring minimal knowledge of the environment. As described, in one embodiment, the invention combines both approaches of free-form search as well as structured search using a query based language grammar that executes at real-time speeds. In one embodiment, the invention provides the ability to simplify query creation by providing natural language search capabilities where simple strings of characters can be used without specifying object relationships or special character delimiters or tokens. The language is able to use object relationships to produce more accurate query results whose results can be relied upon, even by unattended software automation. More generally, the techniques described herein provide for a single unified language construct that simplifies query processing.

The functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed invention are each a data processing system (such as shown in FIG. 1) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the invention can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Alternatively, those instructions or code may be stored in a computer readable storage medium in a server data processing system and adapted to be downloaded over a network to a remote data processing system for use in a computer readable storage medium within the remote system.

In a representative embodiment, the parser, lexical analyzer and model builder components are implemented in a special purpose computer, preferably in software executed by one or more processors. The software is maintained in one or more data stores or memories associated with the one or more processors, and the software may be implemented as one or more computer programs. Collectively, this special-purpose hardware and software comprises a language processor that provides the described functionality.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The query mechanism may be any convenient client-side application, such as a web browser, a command line interface (CLI), a programmatic interface, or the like. As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, FireFox, or the like), but should be broadly construed to refer to any client-side rendering engine that can access and display Internet-accessible resources. Further, while typically the client-server interactions occur using HTTP, this is not a limitation either. Any client-server interaction may be formatted to conform to the Simple Object Access Protocol (SOAP) and travel over HTTP (over the public Internet), FTP, or any other reliable transport mechanism may be used. Also, the term "web site" or "service provider" should be broadly construed to cover a web site (a set of linked web pages), a domain at a given web site or server, a trust domain associated with a server or set of servers, or the like. A "service provider domain" may include a web site or a portion of a web site. Any application or functionality described herein may be implemented as native code, by providing hooks into another application, by facilitating use of the mechanism as a plug-in, by linking to the mechanism, and the like.

While various embodiments have been described above, it should be understood that they have been presented by way of example and not limitation. It will be apparent to persons skilled in the relevant art(s) that various changes in form and detail may be made therein without departing from the spirit and scope. In fact, after reading the above description, it will be apparent to one skilled in the relevant art(s) how to implement alternative embodiments. Thus, the present embodiments should not be limited by any of the above-described embodiments.

In addition, it should be understood that any figures which highlight the functionality and advantages are presented for example purposes only. The disclosed methodology and system are each sufficiently flexible and configurable such that they may be utilized in ways other than that shown.

Further, the purpose of any Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. An Abstract of the Disclosure is not intended to be limiting as to the scope of the present invention in any way.

Although the term "at least one" may often be used in the specification, claims and drawings, the terms "a", "an", "the", "said", etc. also signify "at least one" or "the at least one" in the specification, claims and drawings.

Additionally, the term "comprising" or similar terms in the specification, claims and drawings should be interpreted as meaning "including, but not limited to."

Finally, it is the applicant's intent that only claims that include the express language "means for" or "step for" be interpreted under 35 U.S.C. 212, paragraph 6. Claims that do not expressly include the phrase "means for" or "step for" are not to be interpreted under 35 U.S.C. 212, paragraph 6.

The invention claimed is:

1. A machine-implemented method of information retrieval, comprising:
   receiving object-oriented streamed data comprising events comprising fields, and queries comprising an ordered set of clause definitions, each ordered set of clause definitions comprising a clause pipeline, wherein the clause pipeline comprises an ordered set of clause specifications that comprises an expansion operation and/or a filter operation, wherein the queries are received from a calling application;
   processing the object-oriented data against queries from a query application that formulates the queries and supplies the queries to an information retrieval system, wherein the query application is not part of the information retrieval system, the queries comprising an ordered set of clause definitions, each ordered set of clause definitions comprising a clause pipeline, wherein the clause pipeline comprises an ordered set of clause specifications that comprises an expansion operation and/or a filter operation, wherein the queries are received from a calling application;
   parsing the queries into a collection of expression pools, the parsing comprising: lexing the queries by converting symbols into tokens, compiling the queries into an abstract syntax tree, and traversing the abstract syntax tree to create all expression pools for all queries;
   processing the object-oriented streamed data without modifying the native object-oriented streamed data, sequentially and/or in parallel, by the expression pools in the collection to generate a current object set; and
   returning the current object set to the calling application in response to the queries.

2. The method as described in claim 1, wherein compiling the query into the abstract syntax tree comprises compiling the tokens into the abstract syntax tree.

3. The method as described in claim 1, wherein an expression pool is a pool of processes that are performing a same function for load balancing purposes.

4. The method as described in claim 1, further comprising:
   providing criteria for different queries to an input expression pool;
   for each query:
      sending data received meeting the criteria for the query to the query's initial expression pool;
      processing the data sent to the query's initial expression pool using the queries' additional expression pools until the processed data reaches the query's output expression pool; and
      sending the data from the query's output expression pool to an output destination.

5. The method as described in claim 1, wherein millions of queries are processed in the same node.

6. The method as described in claim 5, wherein a software-based virtual processor is utilized to process the instructions from the expression pools.

7. The method as described in claim 1, wherein each expression pool is a collection of processes, and each process is a sequence of logic with its own memory space.

8. The method as described in claim 1, wherein the processing is done incrementally.

9. The method as described in claim 1, wherein queries may be added and/or queries may be removed during runtime.

10. The method as described in claim 1 wherein the ordered set of clause definitions comprises a time constraint.

11. The method as described in claim 1, wherein the processing comprises: filtering, non-filtering, expanding, traversing relationships to other object; or manufacturing new objects from scratch; or any combination thereof.

12. The method as described in claim 4, further comprising sending the data from the query's output expression pool to another query on the same node and/or another node.

13. A system of information retrieval, comprising:
   a processor configured for:
   receiving object-oriented streamed data comprising events comprising fields, and queries comprising an ordered set of clause definitions, each ordered set of clause definitions comprising a clause pipeline, wherein the clause pipeline comprises an ordered set of clause specifications that comprises an expansion operation and/or a filter operation, wherein the queries are received from a calling application;
   processing the object-oriented data against queries from a query application that formulates the queries and supplies the queries to an information retrieval system, wherein the query application is not part of the information retrieval system, the queries comprising an ordered set of clause definitions, each ordered set of clause definitions comprising a clause pipeline, wherein the clause pipeline comprises an ordered set of clause specifications that comprises an expansion operation and/or a filter operation, wherein the queries are received from a calling application;

parsing the queries into a collection of expression pools, the parsing comprising: lexing the queries by converting symbols into tokens, compiling the queries into an abstract syntax tree, and traversing the abstract syntax tree to create all expression pools for all queries;

processing the object-oriented streamed data without modifying the native object-oriented streamed data, sequentially and/or in parallel, by the expression pools in the collection to generate a current object set; and returning the current object set to the calling application in response to the queries.

14. The system as described in claim 13, wherein compiling the query into the abstract syntax tree comprises compiling the tokens into the abstract syntax tree.

15. The system as described in claim 13, wherein an expression pool is a pool of processes that are performing a same function for load balancing purposes.

16. The system as described in claim 13, wherein the processor is further configured for:

providing criteria for different queries to an input expression pool;

for each query:
sending data received meeting the criteria for the query to the query's initial expression pool;
processing the data sent to the query's initial expression pool using the queries' additional expression pools until the processed data reaches the query's output expression pool; and
sending the data from the query's output expression pool to an output destination.

17. The system as described in claim 13, wherein millions of queries are processed in the same node.

18. The system as described in claim 17, wherein a software-based virtual processor is utilized to process the instructions from the expression pools.

19. The system as described in claim 13, wherein each expression pool is a collection of processes, and each process is a sequence of logic with its own memory space.

20. The system as described in claim 13, wherein the processing is done incrementally.

21. The system as described in claim 13, wherein queries may be added and/or queries may be removed during runtime.

22. The system as described in claim 13, wherein the ordered set of clause definitions comprises a time constraint.

23. The system as described in claim 13, wherein the processing comprises: filtering, non-filtering, expanding, traversing relationships to other object; manufacturing new objects from scratch; or any combination thereof.

24. The system as described in claim 16, wherein the processor is further configured for sending the data from the query's output expression pool to another query on the same node and/or another node.

25. The method of claim 1, wherein the clause definitions also comprise a time constraint.

26. The system of claim 13, wherein the clause definitions also comprise a time constraint.

* * * * *